Dec. 25, 1951 — G. A. LYON — 2,579,504
WHEEL COVER
Filed Nov. 18, 1946
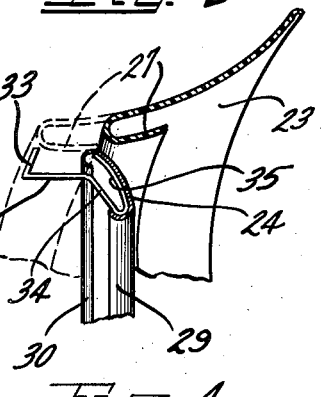
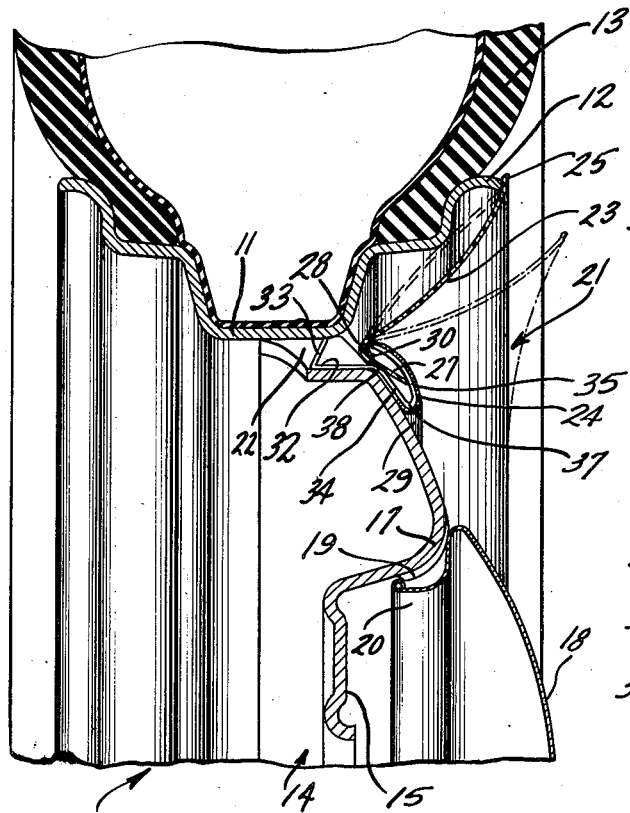
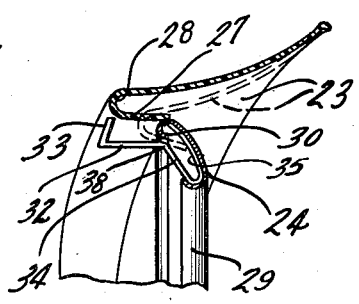
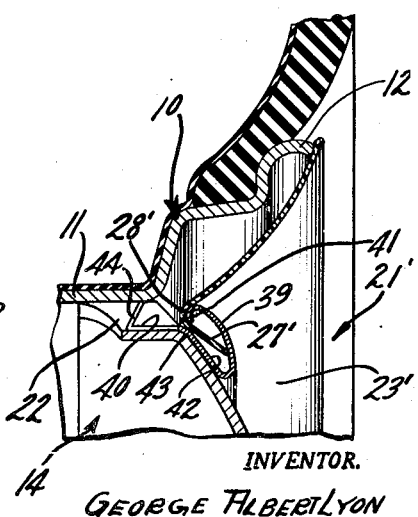
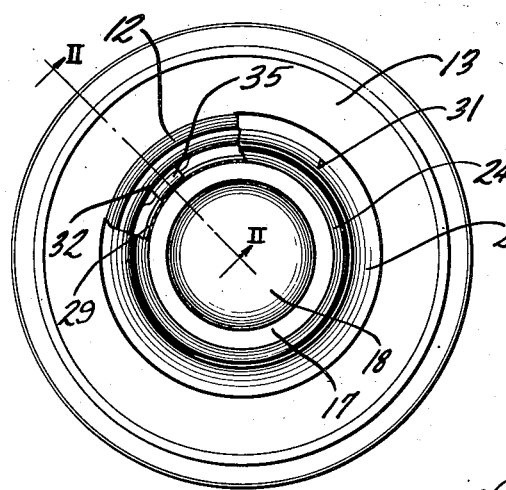
INVENTOR.
GEORGE ALBERT LYON
BY
The Firm of Charles W. Hills Patented Dec. 25, 1951

2,579,504

UNITED STATES PATENT OFFICE 2,579,504

WHEEL COVER

George Albert Lyon, Allenhurst, N. J.

Application November 18, 1946, Serial No. 710,453

14 Claims. (Cl. 301—37)

This invention is directed to an improved wheel structure and relates more particularly to an improved cover assembly therefor.

An important object of this invention is to provide in a wheel structure an improved cover assembly having novel retaining means for maintaining the cover over the outer side of the wheel structure to conceal the same.

Another object of the invention is to provide in a wheel structure including a tire rim and a central load bearing part having circumferentially spaced openings along the junction with the tire rim, an improved cover for concealing the tire rim and said openings and including novel attachment means including parts engageable within said openings for holding said cover in position on the wheel.

Still another object of the invention is to provide an improved wheel structure and cover assembly therefor and particularly an improved retaining structure for securing the cover to the wheel structure, the retaining structure including means for engaging the wheel structure by axial inward movement of the cover assembly until a predetermined relationship of the cover assembly to the wheel structure is attained by engagement with the wheel of movement limiting means of the retaining structure.

A further object of the invention lies in the provision of an improved cover assembly for a wheel structure including a multi-flanged tire rim and a load sustaining body portion wherein the cover assembly ornamentally conceals the outer side of the tire rim and wheel openings between the tire rim and the body part and the cover assembly is attached to the wheel structure in a manner to substantially prevent, or at least inhibit, unauthorized removal of the cover.

A still further object of the invention resides in the provision of a novel wheel trim construction for application to a wheel structure including a multi-flanged tire rim and a load sustaining body portion having wheel openings at the juncture of the rim and body parts wherein a tire rim and wheel opening-concealing cover is secured in place by retaining means interlocked with the inner margin thereof and also interlocked within said wheel openings.

It is also an object of the invention to provide an improved cover assembly for an automobile wheel or the like wherein an ornamental trim ring is interlocked with retaining means for attachment of the cover assembly to the wheel.

Yet another object of the invention is to provide an improved method of assembling a cover member formed from resilient plastic material and a relatively rigid retaining structure.

In accordance with the general features of my invention, there is provided a wheel structure having a tire rim of the drop center type formed with a plurality of stepped flanges and a central load bearing portion secured to the base flange on the tire rim, circumferentially spaced apertures being provided between the load bearing portion and the base flange of the tire rim, the outer side of the tire rim and said apertures being ornamentally concealed by a cover assembly including an annular trim ring member formed from a material having physical characteristics enabling it to be flexed resiliently, temporarily out of its normal position without permanent distortion and being normally self-sustaining as to form, such as a synthetic plastic sheet material, the inner margin of the cover member being formed with a resilient radially inwardly and axially outwardly extending annular flange, and a retaining structure including an ornamental bead portion interlockingly engaged with said flange and having retaining portions extending axially inwardly therefrom for interlockingly engaging within said wheel openings.

In accordance with other features of my invention the construction and arrangement of the cover annulus and the retaining structure is such that when the cover assembly is attached to a wheel, the cover is maintained quite effectively against unauthorized removal, or is at least held upon the wheel in such a manner that the effort and equipment required for removal of the cover assembly are such as to deter unauthorized removal of the assembly, thus minimizing the possibility of theft of the cover.

An additional feature of the invention resides in the improved method for interlockingly assembling a plastic trim ring and a retaining structure wherein the plastic trim ring has a generally divergently related inner marginal flange and the retaining member comprises an ornamental bead and retaining structure affording a deeply reentrant flange-receiving mouth, the flange being flexed into said mouth and then assuming a substantially interlocked relation therein.

According to various forms which the present invention may take, the retaining means in one form comprises an ornamental bead having underturned marginal flanges affording retaining structure for angled retention finger members projecting axially inwardly therefrom for engagement within respective wheel openings between a tire rim and a load sustaining body part assembled with the tire rim.

In another form, the bead of the retaining means has the inner underturned marginal portion thereof extended in a generally radially outward direction to underlie the same at the axially inner part and has integral axially inwardly extending retention fingers formed for bitingly engaging within the openings between a tire rim and a body member of a wheel with which the cover assembly, of which the retaining means forms a part, is adapted to be mounted.

Other objects, features and advantages of the present invention will become apparent from the following description and the accompanying drawings, in which Figure 1 is a side elevational view of a wheel structure embodying one form of my invention, with a portion of the cover broken away to reveal certain details of structure.

Figure 2 is a fragmentary radial cross-sectional view taken substantially along the line II—II of Figure 1.

Figure 3 is a radial cross sectional view through the cover assembly disclosing certain preliminary steps in the method of assembling the trim ring member and the retaining structure of the wheel assembly.

Figure 4 is a view similar to Figure 3 but showing additional steps in the assembly of the cover components.

Figure 5 is a fragmentary radial sectional view through a wheel structure and a modified form of cover assembly, according to the present invention.

As shown on the drawings:

All forms of the invention may be utilized in conjunction with a vehicle wheel such as may be used with an automobile and including a drop center multi-flanged tire rim 10 having a base flange 11 and the usual side flanges including an outer terminal flange 12, appropriately constructed and related for supporting a tire and tube assembly 13.

Concentric with the tire rim 10 is a load bearing or wheel body portion 14 which is secured at its outer margin to the tire rim base flange 11, while its inner margin provides a bolt-on flange 15 by which the wheel is secured to a part of the axle of the vehicle by means of appropriate cap screws or bolts (not shown). The load bearing portion 14 is adapted to be formed from sheet metal appropriately shaped and reinforced as by means of an axially outwardly protruding annular nose portion 17 adapted to provide a seat for a hub cap 18 which may be held in place by means of retaining bumps 19 engaged by a beaded axially inwardly extending flange 20 on the hub cap.

According to the present invention, a cover assembly 21 is provided for ornamentally concealing the outer side of the tire rim 10 and a wheel opening 22 provided between the base flange 11 of the tire rim and the contiguous outer marginal portion of the load bearing portion 14 of the wheel. To this end, the cover assembly 21 includes a trim ring member 23 and a retaining structure 24 by which the trim ring member is retained in place upon the wheel.

The trim ring member 23 is formed from a material such as a relatively thin sheet which is resiliently flexible, enabling it to be flexed out of its normal shape or position without permanent distortion and enabling it to snap back to the original shape and position when the flexing force or pressure is relieved therefrom, thereby affording a self-sustaining and form-retaining as well as flexible structure. For this purpose, I have found a synthetic plastic sheet material such as ethyl cellulose, cellulose acetate, vinyl resins and the like satisfactory.

By preference the material of the trim ring member 23 is of a light or white color so that by having the trim ring formed of concavo-convex cross sectional shape and of a width and curvature to extend from the outer terminal flange 12 of the tire rim to the load sustaining portion 14 of the wheel adjacent to the juncture of the tire rim and the load sustaining member at the wheel openings 22, the trim ring will afford the appearance of being an inward extension of the side wall of the tire 13 and thus simulate a white side wall of a tire of relatively massive proportions and extending clear down to the body of the wheel.

At its outer margin, the trim ring member 23 may be formed with an outwardly curved, inwardly bowed flange 25 for reinforcing the radially outer edge of the trim ring and to facilitate concentric seating of the trim ring upon the outer edge of the terminal flange 12 of the tire rim. At its radially inner margin, the trim ring 23 is formed with a generally radially inwardly and axially outwardly extending annular flange 27 which is joined to the body of the trim ring convergently by an integral juncture of such a radius as to provide a reentrant groove 28 between the diverging body and flange portions of the trim ring.

The retaining member 24 is formed as an ornamental ring or bead of such a width as to accommodate the trim ring flange 27 therebehind in assembly. By preference, the bead 24 is formed from relatively rigid material such as polished, hardened or stainless steel and may be of pleasing outwardly bowed, rounded cross section on a relatively flat radius with the inner and outer margins thereof turned under as shown at 29 and 30 respectively, for reinforcement, finished appearance and other purposes as will be described. The major transverse plane of the bead 24 is preferably oblique to the median plane of the wheel and substantially parallel to the adjacent radially outer side of the nose portion 17.

The rounded, radially outer marginal flange 30 of the retaining bead is adapted to seat within the trim ring groove 28 in assembly and is rounded substantially complementary to the groove radius to afford a backing to sustain the contiguous marginal portions of the trim ring 23 against undue flexure strain when the latter is flexed open as indicated for example in dot-dash outline in Figure 2. On the other hand the trim ring 23 is left free to be flexed inwardly substantially as shown in dash outline in Figure 2, as when the trim ring is engaged by an obstruction or for such purposes as gaining full access to a valve stem which projects through an aperture 31 formed therein (Fig. 1).

The inner marginal, underturned rounded flange 29, like the outer marginal flange 30, is of open hook shaped form and is adapted to provide retaining means for retention members 32 which are of a character to extend axially inwardly from the retaining bead for attaching the cover assembly to the wheel. To this end the retention members 32 are preferably formed from resilient sheet material such as spring steel strips having the axially inner ends thereof formed with respective generally radially and slightly axially outwardly extending finger flanges 33. The latter are adapted herein to engage bitingly with the tire rim base flange 11 when the respective retention members 32 are inserted within the wheel opening 22, whereby to hold the retention members substantially against axially outward withdrawal from the wheel opening and wedging the body portions of the retention members against the respective portions of the wheel body 14 defining the openings.

The outer portions of the retention members 32 are formed with a generally radially inwardly and axially outwardly extending intermediate flange portion 34 and a return bent, generally radially outwardly and axially inwardly extending connecting flange 35 integrally joined with the intermediate flange 34 by a juncture shoulder 37 complementary to and fitting within the hook of the inner marginal flange 29 of the retaining bead. By preference, the connecting flange 35 is curved complementary to the inner transverse shape of the bead 24 and is of a length to fit at its extremity within the hook provided by the outer marginal flange 30 of the bead.

At the convergence of the body of each of the retention members 32 and the intermediate flange 34 thereof is provided a shoulder 38 which opposes the trim ring flange 27 and serves to retain such flange substantially interlocked in assembled relationship with the retaining bead 24.

As a preliminary step in the assembly the trim ring 23 and the retaining bead 24 are moved relatively axially to bring the trim ring flange 27 into abutment at its axially inner side with the axially and radially outer side at the retaining bead 24. Continued relative axial assembly movement causes the trim ring flange 27 to flex axially outwardly and radially outwardly, as shown in full outline in Fig. 3, until it clears the bead flange 30, as shown in broken outline in Fig. 3, and full outline in Fig. 4. Thereupon, the flange 27 snaps radially and axially inwardly, substantially as shown in broken outline in Fig. 4, and reverse flexure thereof, working against the shoulders 38, causes it to draw into substantially the assembled relationship within the mouth between the bead 24 and the flanges 34 of the retention members. This assembly is facilitated by the relatively large clearance afforded within the mouth of the bead since the internal spacings of the mouth are substantially greater than the thickness of the flange so that the flange is received relatively loosely within the mouth, or chamber defined by the bead since interengagement of the radially outer turned bead flange 30 within the groove 28 of the trim ring is primarily relied upon for maintaining the trim ring and the bead assembled on the wheel and the clip shoulders 38 cooperate with the shoulder of the bead flange 30 to maintain the assembled relationship when the cover is off of the wheel.

In the fully assembled relationship of the trim ring 23 and the retaining bead 24, the retaining bead is, of course, in a slanting disposition or convergent relative to the trim ring 23, substantially complementary to the slope of the wheel body 14. As a result, when the cover assembly is mounted upon the wheel by pushing it axially inwardly with the retention members 32 in the respective wheel openings 22, until the inner marginal bead flange 29 engages the wheel body and the retention fingers 33 bitingly engage the tire rim 11 and wedge the body of the retention member 32 against the wheel body, the outer retaining ring flange 30 also acts to hold or clamp the trim ring flange 27 close to or against the wheel body 14. The arrangement is such, moreover, that when the cover is fully assembled with the wheel the trim ring 23 is maintained under at least slight inward axial tension to maintain the outer marginal flange 25 thereof in snug engagement with the edge of the tire rim terminal flange 12.

Removal of the cover assembly 21 from the wheel may be effected only by dislodging the biting retention fingers 33 from their wedging engagement with the tire rim base flange 11 and withdrawal thereof from the wheel openings 22. An ordinary axially outward pull on the cover assembly only serves to cause the biting retention fingers 33 to bite more thoroughly into the tire rim flange 11 and effect a more thorough wedging of the retention members 32 in the respective wheel openings. This feature, taken together with the preferably clamping, interhooked relationship of the retaining structure and the trim ring 23, strongly deters unauthorized removal of the cover assembly.

As an adjunct to the other anti-theft features, the width of the trim ring flange 27 may be somewhat greater than the spacing between the radially outer edge of the retaining bead 24 and the tire rim 10 in the assembly so that even though the flange 27 may for any reason not be tightly clamped in assembly with the bead, or may even be loosened by insertion of a pry-off tool under the radially outer edge of the bead, disassembly of the flange 27 from the bead 24, without removal of the bead from the wheel, is at least substantially hampered, if not entirely prevented.

In the modified form of the invention shown in Fig. 5, the wheel structure is the same, and a cover assembly 21' is provided which includes a trim ring 23', identical with the trim ring 23 already described, but has a retaining bead structure 39 which is of slightly different form in that it is formed with integral retention members 40. To this end, the retaining bead 39 is formed in one piece having a radially outer under-turned rounded flange 41 nested within the juncture groove 28' between the body of the trim ring 23' and the inner marginal interlocking flange 27' thereof. The radially inner marginal, return bent flange of the bead 39 is formed of approximately the same width as the body of the bead, as indicated at 42. In this way, the flange 42 cooperating with the body of the bead 39 affords a deeply reentrant mouth receptive of the trim ring flange 27'.

The retention members 40 are integral generally axially inward extensions from an angular juncture shoulder 43 at the outer margin of the flange 42 opposing the flange 41 in spaced relation to provide a mouth for assembly of the trim ring flange 27' thereinto and engaging the axially inner side of the flange 27' closely adjacent the juncture 28' with the body of the trim ring. From the shoulder 43 the members 40 extend into the wheel openings 22 and have integral generally radially and axially outwardly extending retention fingers 44 which bitingly engage the base flange 11 of the tire rim.

Assembly of the trim ring 23' with the retaining bead 39 may be effected substantially the same as described in connection with the form of the invention shown in Figures 3 and 4. Thereupon assembly with the wheel can be effected in the same manner by pushing the cover assembly axially inwardly until the flange 42 abuts the wheel body 14 at the radially inner side of the wheel openings 22 and the retention fingers 34 hitingly, wedgingly engage the tire rim flange 11 and wedge the body of the retention members 40 against the wheel body.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a cover assembly for disposition over the outer side of a wheel structure having a tire rim part and a central load bearing part, there being circumferentially spaced openings along the junction of the rim and the load bearing parts, a radially outer resilient annular cover member having a cross sectional expanse so that it extends substantially from the radially outer extremity of the rim and radially and axially inwardly beyond the junction of the rim and the load bearing parts to conceal the rim and said junction, said cover member having a generally radially inwardly and axially outwardly extending divergent inner marginal flange, and an annular relatively rigid metallic retaining member for maintaining the cover member on the wheel, said retaining member including means for engaging in said openings in the wheel to retain the same on the wheel and an axially outer, radially outwardly extending retaining bead portion for receiving and completely overlapping said cover member flange therebehind in interhooked relation and with the radially outer edge of the bead portion engaging at the juncture of the flange with the body of the cover member to retain the inner margin of the cover member in place with respect to the wheel, said retaining member also including means cooperating with said radially outer edge of the bead portion to engage the axially inner side of said cover flange adjacent to said juncture to retain the flange against escape from the retaining member before application of the cover to a wheel.

2. In a cover assembly for disposition over the outer side of a wheel structure having a tire rim part and a central load bearing part, there being circumferentially spaced openings along the junction of the rim and the load bearing parts, a radially outer resilient annular cover member having a cross sectional expanse so that it extends substantially from the radially outer extremity of the rim and radially and axially inwardly beyond the junction of the rim and the load bearing parts to conceal the rim and said junction, said cover member having a generally radially inwardly and axially outwardly extending divergent inner marginal flange, and an annular relatively rigid metallic retaining member for maintaining the cover member on the wheel, said retaining member including means for engaging in said openings in the wheel to retain the same on the wheel and an axially outer, radially outwardly extending flattened retaining bead portion for receiving said cover member flange interlockingly therebehind and with the outer edge of the bead resting at the juncture of the flange with the body of the cover member, said retaining member also having an axially inner portion cooperating with said axially outer bead to afford a retaining mouth for said flange within which the flange is substantially loosely received and being disposed as a stop engageable with the wheel to delimit axially inward movement of the retaining member.

3. In a cover structure for a wheel having a flanged tire receiving rim part and a body part, a trim ring adapted to be disposed in concealing relation with the outer side of the tire rim, said trim ring having an inner marginal generally radially inwardly and axially outwardly extending annular flange, and retaining means for said trim ring including a relatively rigid annular structure having a deeply reentrant mouth structure of substantially greater internal spacing than the dimensions of said flange, the mouth opening generally radially outwardly and having said flange assembled therein, said annular structure including an axially outer portion of a radial expanse to overlie said flange to the juncture of the flange with the body of the trim ring and also having a shoulder disposed to engage the axially inner side of the cover flange adjacent said juncture for retaining the flange in the mouth structure prior to assembly of the cover with a wheel.

4. In a cover structure for a wheel having a flanged tire receiving rim part and a body part, a trim ring adapted to be disposed in concealing relation to the outer side of the tire rim, said trim ring having an inner marginal generally radially inwardly and axially outwardly extending annular flange, and retaining means for said trim ring including a relatively rigid annular structure having a deeply reentrant mouth opening generally radially outwardly and having said flange assembled therein, said reentrant mouth being formed in part by an ornamental bead member adapted to lie at the axially outer side of said flange and by retention members assembled with said bead and engaging the axially inner side of said flange and having means thereon for attachment to the wheel said bead member being of a radial expanse to overlie said flange to the juncture of the flange with the body of the trim ring.

5. In a cover structure for a wheel having a flanged tire receiving rim part and a body part, a trim ring adapted to be disposed in concealing relation with the outer side of the tire rim, said trim ring having an inner marginal generally radially inwardly and axially outwardly extending annular flange, and retaining means for said trim ring including a relatively rigid annular structure having a deeply reentrant mouth opening generally radially outwardly and having said flange assembled therein, said retaining means comprising a one piece metal member bent upon itself to provide an axially outer ornamental bead portion and an axially inner flange spaced from said bead portion to a substantially greater extent than the thickness of the flange to provide said reentrant mouth and having wheels engaging means at the radially outer edge thereof, said bead portion being of a radial expanse to overlie said flange to the juncture of the flange with the body of the trim ring.

6. In a cover structure for a wheel having a tire rim and a load sustaining body with circumferentially spaced openings between the rim and the body, a cover including a trim ring formed from resilient plastic material and dimensioned to lie in concealing relation to the outer side of the rim and having an inner generally radially inwardly and axially outwardly extending marginal flange convergently related to the main body thereof and adapted to lie closely adjacent to the wheel body radially inwardly of the body and rim juncture, and a retaining structure for said trim ring comprising an ornamental bead member having an underturned rounded radially outer marginal flange seating within the groove provided between said trim ring body and inner marginal flange thereof and being of a width to extend radially inwardly beyond said flange and having its radially inner margin turned under, and means extending from said underturned radially inner margin of the bead into retaining engagement with the axially inner side of the trim ring flange adjacent to juncture thereof with the body of the trim ring including retention flanges bitingly engageable within said wheel openings.

7. In a cover structure for a wheel having a tire rim and a load sustaining body with circumferentially spaced openings between the rim and the body, a cover including a trim ring formed from resilient plastic material and dimensioned to lie in concealing relation to the outer side of the rim and having an inner generally radially inwardly and axially outwardly extending marginal flange convergently related to the main body thereof and adapted to lie closely adjacent to the wheel body radially inwardly of the body and rim juncture, and a retaining structure for said trim ring comprising an ornamental bead member having an underturned rounded radially outer marginal flange seating within the groove provided between said trim ring body and inner marginal flange thereof and being of a width to extend radially inwardly beyond said flange and having its radially inner margin turned under, and means extending from said underturned radially inner margin of the bead including retention flanges bitingly engageable within said wheel openings, said retention means comprising individual metallic strip members formed with return bent heads fixedly interlocked with the marginal flanges of the bead and arranged to hold the bead in engagement with the wheel body in the fully assembled relationship of the cover with the wheel and also including shoulders engaging against the axially inner side of the trim ring flange.

8. In a cover structure for a wheel having a tire rim and a load sustaining body with circumferentially spaced openings between the rim and the body, a cover including a trim ring formed from resilient plastic material and dimensioned to lie in concealing relation to the outer side of the rim and having an inner generally radially inwardly and axially outwardly extending marginal flange convergently related to the main body thereof and adapted to lie closely adjacent to the wheel body radially inwardly of the body and rim juncture, and a retaining structure for said trim ring comprising an ornamental bead member having an underturned rounded radially outer marginal flange seating within the groove provided between said trim ring body and inner marginal flange thereof and being of a width to extend radially inwardly beyond said flange and having its radially inner margin turned under, and means extending from said underturned radially inner margin of the bead including retention flanges bitingly engageable within said wheel openings, said retention means comprising individual metallic strip members formed with return bent heads fixedly interlocked with the marginal flanges of the bead and arranged to hold the bead in engagement with the wheel body in the fully assembled relationship of the cover with the wheel and including shoulders engaging against the axially inner side of the trim ring flange, said inner flange of the bead providing an abutment engageable with the wheel at the radially inner side of said wheel opening.

9. In combination in an ornamental wheel trim, a trim ring adapted to overlie the tire rim portion of a wheel assembly and being of an expanse to extend to the body portion of the wheel, the inner margin of the trim ring body having a generally radially inwardly and axially outwardly extending divergent flange, and an annular retaining structure including a bead portion of a radial expanse to overlie said flange concealingly and with the radially outer margin of the bead cooperating in interhooked relation in the juncture groove between the flange and the ring body, and means extending from the radially inner margin of the bead and underlying said flange, said means extending to a point axially inwardly opposite the radially outer margin of the bead and providing a shoulder cooperating with said radially outer margin of the bead for retainingly engaging the flange therebetween, said means and said bead portion radially inwardly from the outer margin of the bead being spaced apart to a substantially greater extent than the thickness of the flange so as to facilitate flexing assembly of the flange into position between said means and the bead portion, there being wheel engaging structure extending axially inwardly from said shoulder.

10. In a wheel cover structure, a cover member of circular form comprising divergently related portions, one of said portions comprising a cover body adapted to overlie a substantial portion of a vehicle wheel and the other of said divergent portions comprising a marginal flange on said wheel covering portion, said flange and said wheel covering portion being joined on a rounded juncture defining an axially outwardly opening groove, and a retaining member overlying the flange in completely concealing relation and having a turned rounded marginal formation retainingly engaging in said groove, and means carried by the retaining member and extending behind the flange in cooperation with said turned margin to engage the flange close to the back of said groove and maintain the flange in assembly with the retaining member and including means projecting beyond said flange for retaining engagement with a portion of the wheel to which the cover may be applied.

11. In a wheel trim assembly, a resiliently flexible plastic trim ring having a generally radially inwardly and axially outwardly extending inner marginal flange, and a retaining member including a generally radially outwardly opening deeply reentrant mouth receptive of said flange including a marginal formation engaging at the juncture of said flange with the main body of the trim ring and means defining a shoulder behind the marginal formation engaging the back of said flange adjacent said juncture and cooperating with the marginal formation to retain the retaining member and the trim ring in assembly, the mouth radially inwardly from the shoulder and marginal formation affording a clearance substantially greater than the thickness of the flange so that the flange can be assembled within the mouth by flexing the flange past said shoulder and said marginal formation into the clearance within the mouth.

12. In a wheel trim assembly, a resiliently flexible plastic trim ring having a generally radially inwardly and axially outwardly extending inner marginal flange, and a retaining member including a generally radially outwardly opening deeply reentrant mouth receptive of said flange including a marginal formation engaging at the juncture of said flange with the main body of the trim ring and means defining a shoulder behind the marginal formation engaging the back of said flange adjacent said juncture and cooperating with the marginal formation to retain the retaining member and the trim ring in assembly, the mouth radially inwardly from the shoulder and marginal formation affording a clearance substantially greater than the thickness of the flange so that the flange can be assembled within the mouth by flexing the flange past said shoulder and said marginal formation into the clearance within the mouth, said marginal formation being disposed in radially outwardly offset relation to the shoulder, and the shoulder having a rounded formation so as to facilitate passage of the edge of the flange thereby in assembling the flange into the mouth.

13. In a wheel cover structure, a retaining member for securing a cover member made of sheet material in place, said retaining member comprising an annular bead made from sheet material and having an underturned radially inner margin, and a clip having a radially outwardly opening hook-shaped head formed with a radially inwardly directed juncture shoulder complementary and fitting within the underturned inner margin of the bead and with the axially outer side of the hook engaging the inner side of the body portion of the bead and with the axially inner side of the hook extending radially outwardly in spaced relation to the axially outer portion of the hook and having wheel-engaging means projecting from the radially outer end thereof, said axially inner portion of the clip head and the radially outer margin of the bead being cooperatively related to engage and retain a flange on the margin of the cover member for maintaining the cover member and the retaining member in assembled relation.

14. In a wheel structure including a wheel body and a multi-flange tire rim, the wheel body having wheel openings at the juncture with the tire rim, a trim ring assembly for substantially concealing the tire rim and including a body portion extending generally radially and axially outwardly and having a radially inwardly and axially outwardly extending divergent inner marginal flange with the juncture of the flange and the body lying adjacent the radially inner sides of the wheel openings in spaced relation to the tire rim, and a retaining bead having a body portion overlying said inner marginal flange and having the radially outer margin thereof engaging within the groove formed between the flange and said body portion and clamping the juncture in place on the wheel, the bead having means extending from the radially inner side thereof behind the flange and retainingly engaging within said wheel openings, the space between the radially outer cover retaining margin of the bead and the tire rim being narrower than the width of said flange so as to prevent displacement of said flange radially outwardly from beneath the bead.

GEORGE ALBERT LYON.

REFERENCES CITED

The following references are of record in the file of this patent:

UNITED STATES PATENTS

| Number | Name | Date |
| --- | --- | --- |
| 2,368,253 | Lyon | Jan. 30, 1945 |
| 2,386,244 | Lyon | Oct. 9, 1945 |